United States Patent
Gonzalez

(10) Patent No.: US 7,393,045 B1
(45) Date of Patent: Jul. 1, 2008

(54) TWO-PIECE ARMORED CAB SYSTEM

(75) Inventor: Rene' G. Gonzalez, Southfield, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 272 days.

(21) Appl. No.: 11/340,005

(22) Filed: Jan. 17, 2006

(51) Int. Cl.
B62D 33/06 (2006.01)

(52) U.S. Cl. .............................. 296/190.04; 296/190.01; 296/190.03; 296/190.11; 180/89.13; 89/36.08

(58) Field of Classification Search ............. 296/190.01, 296/190.03, 190.05, 190.08, 190.11; 89/36.08, 89/36.09; 180/89.12, 89.13, 89.14, 89.15, 180/89.16, 89.17, 89.18, 89.19
See application file for complete search history.

(56) References Cited

U.S. PATENT DOCUMENTS

| | | | | |
|---|---|---|---|---|
| 2,362,453 A | * | 11/1944 | Cosper | 180/89.15 |
| 2,591,380 A | | 4/1952 | Schreiner | |
| 2,781,102 A | * | 2/1957 | Prichard | 180/89.14 |
| 2,838,126 A | * | 6/1958 | Gleasman | 180/89.14 |
| 3,284,129 A | | 11/1966 | Jaulmes | |
| 3,485,522 A | | 12/1969 | Reinarts | |
| 3,737,192 A | * | 6/1973 | Hirsch | 296/190.05 |
| 4,231,144 A | | 11/1980 | Bernacchia, Jr. | |
| 4,282,641 A | | 8/1981 | Phillips | |
| 4,303,271 A | | 12/1981 | Law | |
| 4,326,445 A | | 4/1982 | Bemiss | |
| 4,378,945 A | * | 4/1983 | Trautman | 277/608 |
| 4,392,682 A | | 7/1983 | Norkus, Jr. | |
| 4,398,446 A | | 8/1983 | Pagano et al. | |
| 4,422,685 A | | 12/1983 | Bonfilio et al. | |
| 4,605,257 A | | 8/1986 | Lang et al. | |

(Continued)

FOREIGN PATENT DOCUMENTS

EP 0029880 A1 * 6/1981

(Continued)

OTHER PUBLICATIONS

Abstract and Machine Translations of the claims and specification of EP0029880, Jan. 2008.*

(Continued)

*Primary Examiner*—Jason S Morrow
(74) *Attorney, Agent, or Firm*—David L. Kuhn; Thomas W. Saur; Luis Miguel Acosta

(57) ABSTRACT

A system for a two-piece armored cab includes an upper cab portion, a lower cab portion, and a vehicle chassis system. The upper cab portion and the lower cab portion are armored to provide protection to occupants of the cab system. The upper cab portion removably mates to the lower cab portion at a mating line that comprises a lower edge of the upper cab portion and an upper edge of the lower cab portion. The lower cab portion is mounted to the vehicle chassis system such that the vehicle chassis system is operable when the upper cab portion is removed from the lower cab portion as well as when the upper cab portion is mated to the lower cab portion.

7 Claims, 3 Drawing Sheets

U.S. PATENT DOCUMENTS

| | | | |
|---|---|---|---|
| 4,676,545 A | 6/1987 | Bonfilio et al. | |
| 4,842,326 A | 6/1989 | DiVito | |
| D308,187 S | 5/1990 | Ottevaere et al. | |
| D315,535 S | 3/1991 | Lockhart | |
| 5,016,935 A | 5/1991 | Semple | |
| D323,305 S | 1/1992 | Smith | |
| 5,150,942 A | 9/1992 | Fujan et al. | |
| 5,159,746 A | 11/1992 | Saggese | |
| 5,282,661 A | 2/1994 | Arnberger | |
| 5,490,314 A | 2/1996 | Riddle | |
| 5,499,568 A | 3/1996 | Turner | |
| 5,551,826 A * | 9/1996 | Todd et al. | 414/685 |
| 5,663,520 A | 9/1997 | Ladika et al. | |
| D403,620 S | 1/1999 | Abalos et al. | |
| 5,934,397 A | 8/1999 | Schaper | |
| 6,076,884 A | 6/2000 | Osman | |
| D439,586 S | 3/2001 | Moehle et al. | |
| 6,302,010 B1 | 10/2001 | Holler | |
| 6,327,954 B1 | 12/2001 | Medlin | |
| 6,363,830 B1 | 4/2002 | Gonzalez | |
| 6,619,177 B1 * | 9/2003 | Hansen et al. | 89/1.13 |
| 6,880,856 B2 | 4/2005 | Chernoff et al. | |
| 6,883,860 B1 | 4/2005 | Budge | |
| 6,896,319 B1 | 5/2005 | Huang et al. | |
| 6,918,627 B2 | 7/2005 | Mataja et al. | |
| 6,935,679 B2 * | 8/2005 | Myers et al. | 296/190.02 |
| 2006/0005695 A1 * | 1/2006 | Honlinger et al. | 89/36.08 |
| 2006/0288856 A1 * | 12/2006 | Labock | 89/36.04 |

FOREIGN PATENT DOCUMENTS

| | | |
|---|---|---|
| GB | 2133356 A | 7/1984 |

OTHER PUBLICATIONS

U.S. Appl. No. 11/217,856, filed Aug. 22, 2005, R. Gonzalez, "Up-Armor Kit Integration with Tactical Vehicle".

* cited by examiner

TWO-PIECE ARMORED CAB SYSTEM

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a two-piece armored cab system.

2. Background Art

Conventional armored vehicles (e.g., vehicles used for military or security related applications) typically have protective armor surrounding the cab (i.e., cabin, passenger compartment, etc.) region of the vehicle. Such protective armor is intended to provide occupants of the cab (e.g., driver, passenger, etc.) a desired degree of protection from hostile attack via explosive devices, mortar rounds, small arms fire, grenades, and the like. The protective armor surrounding the cab on a conventional vehicle is typically implemented to provide a single-piece armored vehicle cab where the armor is implemented as multiple pieces of armor that are fastened to a unitary infrastructure.

Protective armor usually adds a significant weight to the armored vehicle. Protective armor can also add to the overall height of the vehicle. Such additions to the weight and height of the vehicle can make the vehicle difficult to transport to a desired use location. In particular, armored vehicles are often transported by airplane to a location of immediate need as other modes of transportation do not provide the speed of deployment desired. One particular problem sometimes encountered (e.g., with some cab-over and cab-forward vehicles) is that the concentrated weight of an armored vehicle at a wheel or axle location may exceed the cargo carrying capacity of the floor structure of the airplane.

Conventional approaches to the air shipment of armored vehicles typically are implemented by shipment of the vehicle in an unarmored or partially armored condition, and remote field installation or reinstallation of the complete armor package that includes many individual sections of armor. The field installation of the armor package can be excessively time consuming and extremely onerous to the individuals who perform the installation as facilities to aid the installation are often very limited and the number of armor components that are to be installed is often numerous. The user of conventional armored cab vehicles typically has two choices (i) attempt to transport a vehicle that has a single piece (unitary) armored cab that can exceed weight and heights limits, and (ii) transport the unarmored or partially armored vehicle and install numerous armor components on the vehicle when the vehicle has reached the desired destination.

Thus, there exists a need and an opportunity for an improved armored cab system. Such an improved system may overcome one or more of the deficiencies of the conventional approaches.

SUMMARY OF THE INVENTION

Accordingly, the present invention may provide an improved armored cab system.

According to the present invention, a system for a two-piece armored cab is provided. The cab system comprises an upper cab portion, a lower cab portion, and a vehicle chassis system. The upper cab portion and the lower cab portion are armored to provide protection to occupants of the cab system. The upper cab portion removably mates to the lower cab portion at a mating line that comprises a lower edge of the upper cab portion and an upper edge of the lower cab portion. The lower cab portion is mounted to the vehicle chassis system such that the vehicle chassis system is operable when the upper cab portion is removed from the lower cab portion as well as when the upper cab portion is mated to the lower cab portion.

The cab system further comprises at least one armored cab door, and the cab door comprises an upper door section and a lower door section that are hinged at the mating line such that in one mode of operation the upper door portion folds down, and, alternatively, in another mode of operation, the lower door portion fold ups when the upper and lower cab portions are separated.

The cab system further comprises at least one armored cab door, and the cab door comprises an upper door section that remains with the upper cab portion, and a lower door section that remains with the lower cab portion when the upper and lower cab portions are separated.

The cab system further comprises at least one armored cab door, and the cab door is implemented within the structure of the upper cab portion such that, when the upper cab portion is separated from the lower cab portion, the entire cab door is contained within the upper cab portion.

The cab system wherein the lower edge of the upper cab portion and the upper edge of the lower cab portion are implemented as complementary flanges, and the flanges are mechanically coupled via fasteners.

A vehicle where the cab system is implemented has an overall vertical vehicle clearance when the upper cab portion is removed, CU, and the upper cab portion has a height, HU, that is selected such that the overall vertical vehicle clearance when the upper cab portion is removed, CU, is less than vertical vehicle clearance when is upper cab portion is mated to the lower cab portion, and the overall vertical vehicle clearance when the upper cab portion is removed, CU, is less than the maximum vertical stowage clearance of a C-130 transport aircraft.

The cab system where the upper cab portion height, HU, is selected such that weight distribution and handling characteristics of the vehicle where the cab system is implemented are optimized when the upper cab portion is stowed on a bed of the vehicle.

The cab system where the upper cab portion is positioned on a bed of a vehicle where the cab system is implemented to provide weight distribution such that the weight concentration on front and rear axles of the vehicle is less than the maximum weight concentration value of a C-130 transport aircraft.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved armored cab system. The present invention is generally implemented as a two-piece armored cab.

The present invention is generally implemented in connection with armored vehicles (e.g., vehicles used for military or security related applications) to provide protective armor surrounding the cab (i.e., cabin, passenger compartment, etc.) region of the vehicle. Such protective armor may provide occupants of the cab (e.g., driver, passenger, etc.) a desired degree of protection from hostile attack via explosive devices, mortar rounds, small arms fire, grenades, and the like. The present invention may be especially advantageously implemented in connection with armored versions of cab-over and cab-forward vehicles. However, the present invention may be implemented in connection with any appropriate armored vehicle.

Figure 1:
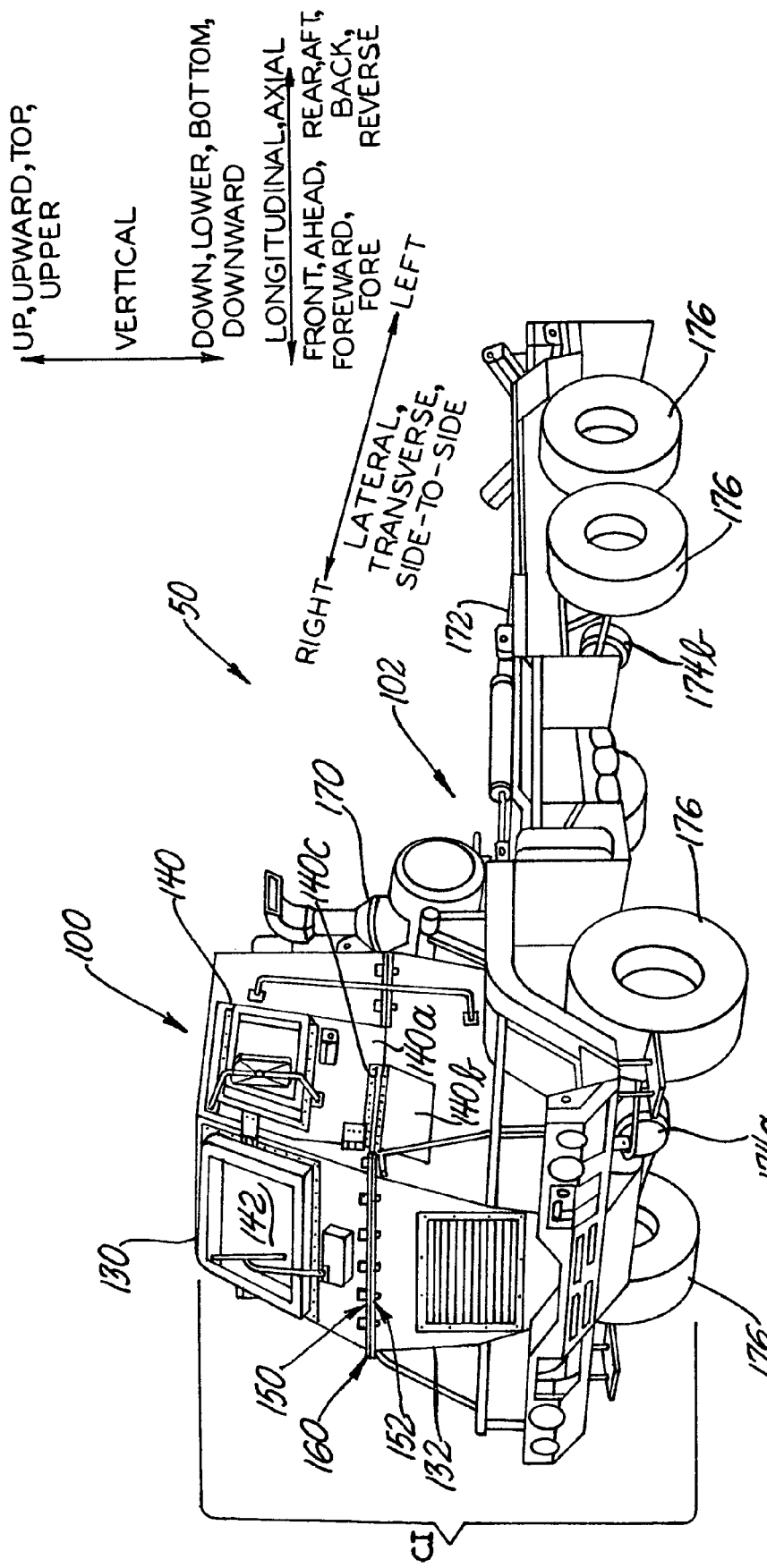
FIG. 1 is a diagram of an armored vehicle including the present invention.

Referring to FIG. 1, a diagram illustrating a vehicle 50 comprising an example of a two-piece armored vehicle cab system (i.e., apparatus, assembly, structure, etc.) 100 of the present invention is shown. The vehicle 50 further comprises a vehicle chassis system 102. Relative directions (e.g., vertical, longitudinal, etc.) are generally as shown. Lateral (i.e., transverse, left-right, etc.) directions are generally perpendicular to the vertical-longitudinal plane.

The cab (i.e., cabin, passenger compartment, etc.) 100 generally comprises an upper portion (i.e., section, part, subassembly, etc.) 130, a lower portion 132, and at least one door 140. The upper subassembly 130 generally comprises a windshield 142. The upper section 130 and the lower section 132 are generally armored to comprise a two-piece armored vehicle cab. The upper section 130 and the lower section 132 generally mate (i.e., interface, install, connect, assemble, couple, combine, fit together, etc.) at a lower edge 150 of the upper section 130 and an upper edge 152 of the lower section 132 to form a mating line (i.e., separation line, break line, parting line, etc.) 160. As described in more detail below in connection with FIG. 6, in one example, the lower edge 150 of the upper section 130 and the upper edge 152 of the lower section 132 may be implemented as complementary mating flanges.

When the upper cab subassembly 130 is installed on the lower cab subassembly 132 the vehicle cab 100 may provide armored protection to occupants of the cab system 100 that is substantially (i.e., essentially, about, etc.) the same as protection provided by a conventional single-piece armored vehicle cab where the armor is typically implemented as multiple pieces of armor that are fastened to a unitary infrastructure. The vehicle 50 generally has an overall vertical vehicle clearance, CI, when the upper cab subassembly 130 is installed on the lower cab subassembly 132.

In one example, the door 140 may comprise an upper door part 140a and a lower door part 140b. The upper door section 140a and the lower door section 140b may be selectively flexibly interconnected via a hinge 140c. The hinge 140c is generally horizontally disposed at or near the mating line 160. In one example, the door portion 140a may fold down, and, alternatively, in another example, the door portion 140b may fold up such that each door portion 140a and 140b is integral with the respective upper vehicle cab section 130 (140a) and lower vehicle cab section 132 (140b). A latch mechanism (not shown) may hold the door section 140a and the lower door section 140b substantially rigidly together when the upper vehicle cab section 130 and lower vehicle cab section 132 are coupled together.

Figure 4:
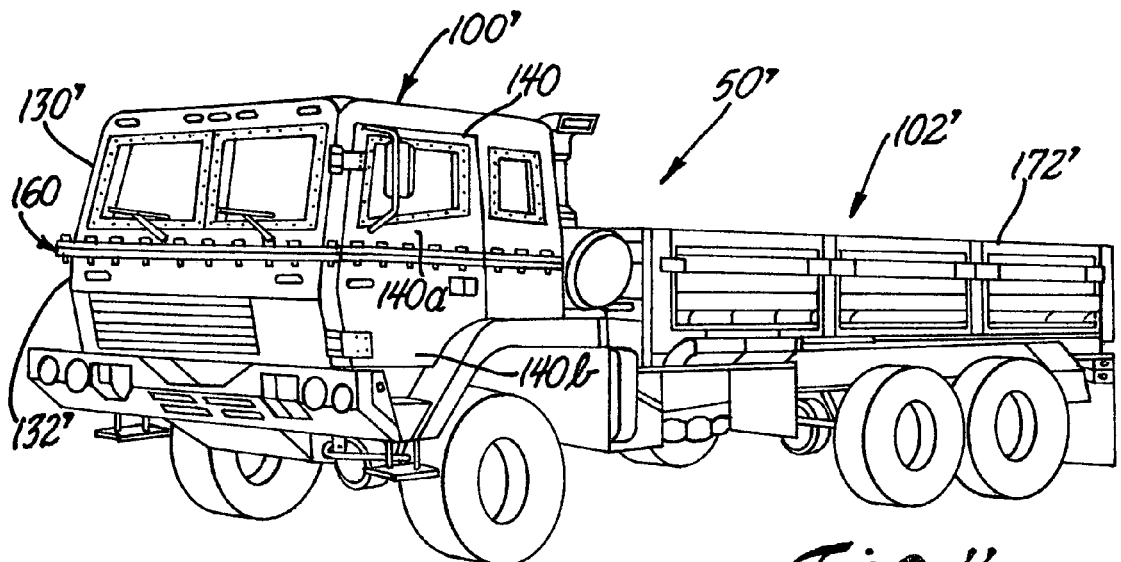
FIG. 4 is a diagram of another example of an armored vehicle including the present invention.
Figure 5:
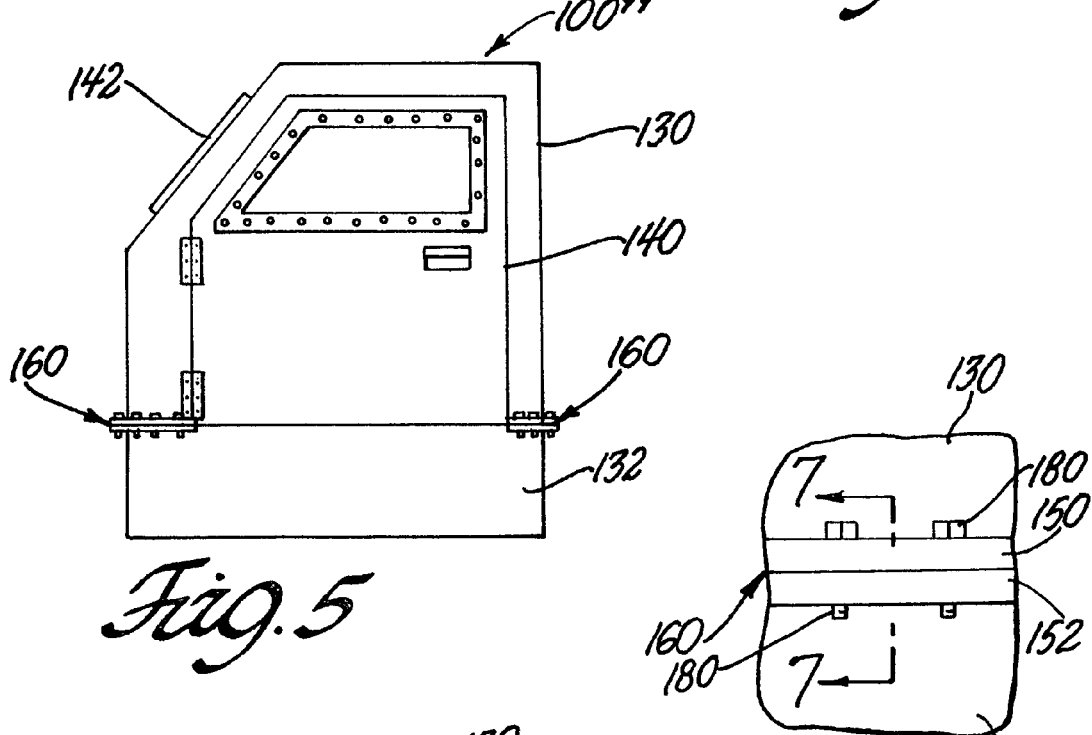
FIG. 5 is a diagram of a side view of an example of a two-piece armored vehicle cab of the present invention.

In another example (as illustrated in FIG. 4), the hinge 140c may be deleted, and door 140 may comprise a section 140a that remains with the upper cab section 130 and a section 140b that remains with the lower cab portion 132 when the cab portions 130 and 132 are separated. The separation of the doors sections 140a and 140b is generally implemented at or near the parting line 160. In yet another example (not shown), the door 140 may be a single piece assembly that is removed from the cab 100 when the cab portions 130 and 132 are separated. In yet a further example (as illustrated in FIG. 5), the door 140 may be a single piece assembly that remains with the cab portion 130 (or, alternatively, not shown, the cab portion 132) when the cab portions 130 and 132 are separated.

The vehicle chassis system 102 generally comprises a powertrain 170, a bed 172, axles 174 (e.g., front axle 174a and at least one rear axle 174b), and wheels 176. The powertrain 170, axles 174, and wheels 176 are generally interconnected to provide motivation to move the vehicle 50. The bed 172 generally provides an area for hauling cargo, freight, and the like. The vehicle 50 may be implemented having a cab-over configuration (i.e., the cab assembly 100 may be mounted substantially over the front axle 174a of the vehicle 50). The bed 172 may be implemented as a so-called flat bed having a height, HB, above the surface upon which the vehicle 50 rests.

The vehicle chassis system 102 is generally operable when the upper cab portion 130 is removed as well as when the upper cab portion 130 is installed to the lower cab portion 132. As such, the vehicle 50 may be moved, driven, and used in an "open cab" configuration when the upper cab section 130 is separated from the lower cab section 132 (as illustrated, for example, in FIG. 3).

Figure 2:
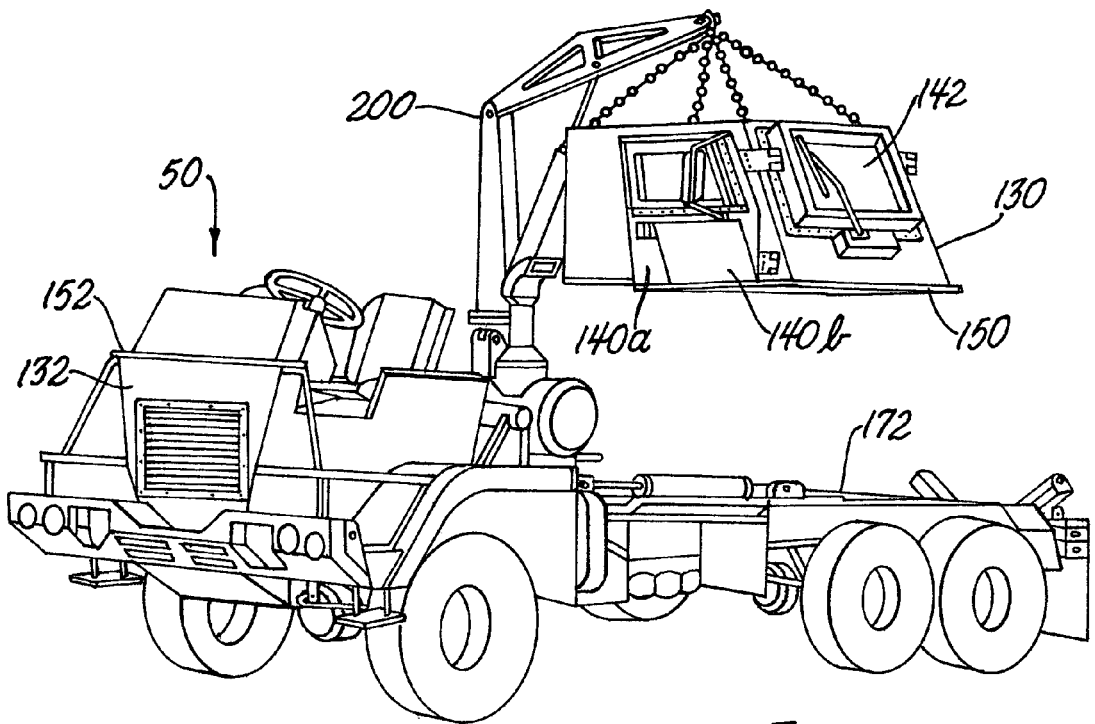
FIG. 2 is a diagram of the armored vehicle of FIG. 1 with the two-piece cab of the present invention shown in a disassembled state.

Referring to FIG. 2, a diagram illustrating separation of the upper cab section 130 from the lower cab section 132 using a crane 200 is shown. The lower door section 140b may be folded up and retained against the upper door section 140a. The cab apparatus 100 of the present invention having a single separation at the break line 160 may advantageously provide for rapid, simple, and convenient removal and installation of the upper cab part 130 vis a vis the lower cab part 132. While the cab system 100 of the present invention is illustrated using the crane 200 to aid the assembly and disassembly processes of the upper cab section 130 from the lower cab section 132, any appropriate apparatus and method such as a hoist, block and tackle, manual labor, and the like may be implemented to aid the disassembly and assembly processes to meet the design criteria of a particular application.

Figure 3:
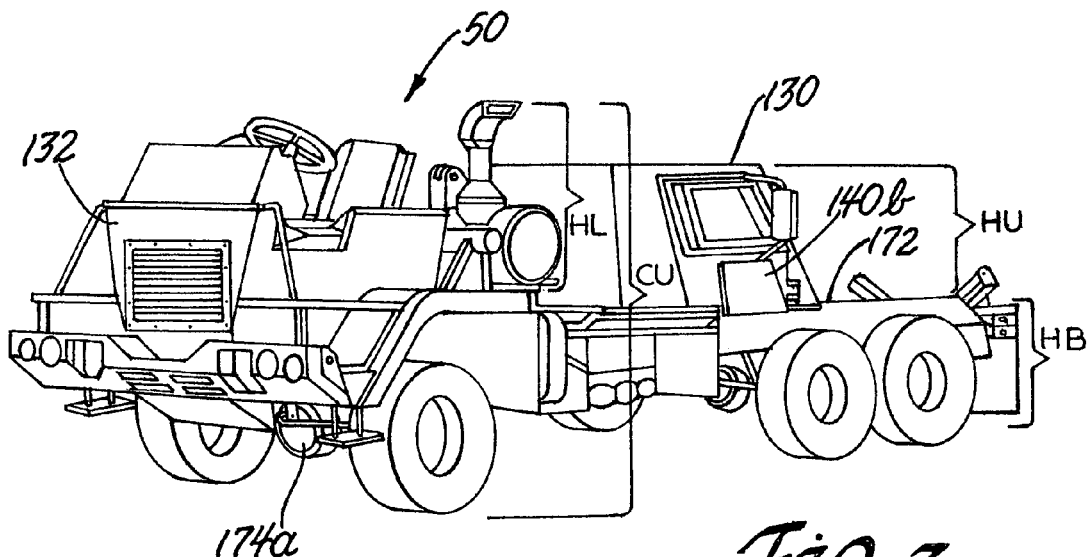
FIG. 3 is another diagram of the armored vehicle of FIG. 1 with the two-piece cab of the present invention shown in a disassembled state and a top section of the vehicle cab is stowed on the bed of the vehicle.

Referring to FIG. 3, a diagram illustrating placement of the upper cab section 130 on the bed 172 is shown. The upper cab section 130 may be advantageously disposed (i.e., stowed, placed, positioned, etc.) on and fastened (i.e., fixed, bolted, clamped, tied, strapped, chained, etc.) to the bed 172 such that the truck 50 may be more conveniently, efficiently, and effectively transported when compared to a vehicle having a conventional one-piece armored cab.

In particular, the two-piece armored cab system 100 of the present invention may provide an improved weight distribution for transportation of the vehicle 50 as the weight of the upper cab portion 130 is distributed via the bed 172 rather than concentrated over the front axle 174a. The two-piece armored cab system 100 of the present invention may provide an improved weight distribution for transportation of the vehicle 50 as the position of upper cab portion 130 on the bed 172 may be selected such that the weight distribution on the front and rear axles 174 is less than the maximum weight concentration value (i.e., less than the maximum pounds per square inch) of typical vehicles (not shown, e.g., C-130 aircraft and the like) that are used to transport the vehicle 50.

Further, when the upper cab section 130 is removed from the lower cab section 132, the overall height of the vehicle 50 may be reduced when compared to a vehicle having a conventional one-piece armored cab. In particular, the upper cab section 130 may have a height, HU, and the lower cab section 132 including the powertrain 170 may have a height that extends above the bed 172, HL, where the upper cab section height, HU, is less than the lower cab section height, HL. When the upper cab section 130 is removed from the lower cab section 132, the overall height of the vehicle 50 may have a value, CU.

Thus, when the upper cab section 130 is stowed on the bed 172, the height of the lower cab section 132 including the powertrain 170, HL, plus the height, HB, of the flat bed 172 generally determines the overall height clearance (i.e., the vertical distance from the surface on which the vehicle 50 rests to the maximum vertical distance of the vehicle 50), CU, of the vehicle 50. The value, CU, (the vehicle 50 height when the upper cab section 130 is stowed on the bed 172) is generally less than the value, CI, (the vehicle 50 height when the upper cab section 130 is installed on the lower cab section 132). Generally, CU=HL+HB, HU<HL, and CU<CI.

In one example, the upper cab height, HU, may be selected such that the overall vertical vehicle clearance, CU, when the upper cab section 130 is removed is less than the maximum vertical stowage clearance provided by typical vehicles (not shown, e.g., C-130 aircraft) that are used to transport the vehicle 50. As such, the system 100 may provide more rapid deployment of the armored vehicle 50 than provided by conventional unitary armor systems which typically have a height approximately, CI. A conventional unitary armored vehicle cab may exceed the maximum vertical clearance that is provided by typical vehicles used for transport which may cause the transportation of the conventional unitary armored vehicle by slower, less timely methods such as ship or rail.

The upper cab height, HU, may also determine the overall weight of the upper cab portion 130. That is, the amount of material that comprises the upper cab portion 130 is directly dependent upon the height, HU. As such, in one example, the weight of the upper cab portion 130 may be selected (i.e., calculated, determined, estimated, etc.) such that weight distribution and handling characteristics of the vehicle 50 when transported can be optimized when the upper cab portion is stowed on the bed 172.

When the armor package of the vehicle 50 is to be configured to provide protection to occupants of the cab 100 (i.e., when the cab sections 130 and 132 are fastened together), as the cab 100 comprises a two-piece apparatus, the upper cab portion 130 is generally quickly and easily assembled to the lower cab portion 132. In contrast, the time and effort to configure a conventional unitary armored vehicle cab armor having a multi-piece armor package can be extensive.

Referring to FIG. 4, a diagram illustrating a vehicle 50' comprising an example of a two-piece armored vehicle cab system 100' of the present invention is shown. The vehicle 50' may be implemented as another example of an armored vehicle including the present invention. The vehicle cab 100' is generally implemented similarly to the vehicle cab 100. The vehicle cab system 100' generally comprises an upper cab section 130' and a lower cab section 132'. The vehicle 50' further comprises a vehicle chassis system 102'. The vehicle chassis system 102' may include a stake-bed 172'.

An unhinged, flanged version of the door 140 of the vehicle cab 100' may be implemented within the structure of the cab system 100'. As such, when the upper cab section 130' is separated from the lower cab section 132', the upper door section 140a may be integral with the upper cab section 130' and the lower door section 140b may be integral with the lower cab section 132'.

Referring to FIG. 5, a diagram illustrating a side view of a two-piece armored vehicle cab system 100" of the present invention is shown. The vehicle cab 100" is generally implemented similarly to the vehicle cab 100. An unhinged version of the door 140 of the vehicle cab 100" may be implemented within the structure of the upper cab section 130. As such, when the upper cab section 130 is separated from the lower cab section 132, the entire door 140 may be contained within the upper cab section 130.

Figure 6:
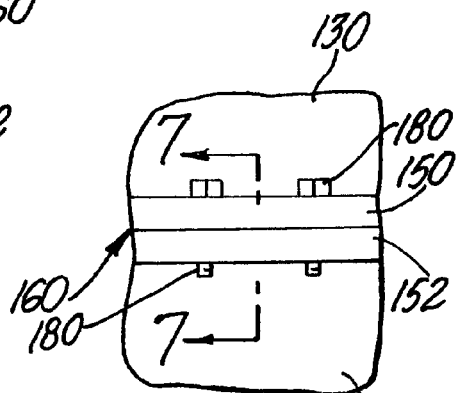
FIG. 6 is a diagram of a broken out section of the interface between sections of an example of a two-piece armored vehicle cab of the present invention.

Referring to FIG. 6, a diagram illustrating detail of a broken out section of the interface 160 between the upper and lower cab portions 130 and 132, respectively, of an example of the two-piece armored vehicle cab 100 of the present invention is shown. In one example, the bottom edge 150 of the upper cab section 130 and the top edge of the lower cab section 132 may be implemented as complementary (i.e., matching, mating, etc.) flanges. The flanges 150 and 152 may be mechanically coupled via fasteners (e.g., bolts, rivets, studs/nuts, etc.) 180. However, the interface 160 may be implemented via any appropriate edges 150 and 152 and fastening apparatus or method (e.g., welding) to meet the design criteria of a particular application.

Figure 7:
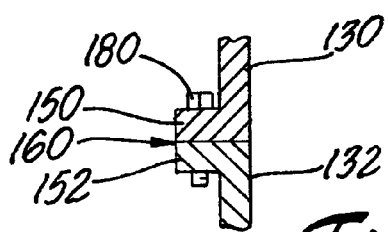
FIG. 7 is a sectional view of the interface between sections of FIG. 6.

Referring to FIG. 7, diagram illustrating a sectional view taken at line 7-7 of FIG. 6 of the interface 160 between the upper and lower cab portions 130 and 132, respectively, is shown.

As is apparent then from the above detailed description, the present invention may provide an improved, two-piece armored vehicle cab. Such an improved vehicle cab may overcome one or more deficiencies of conventional approaches.

Various alterations and modifications will become apparent to those skilled in the art without departing from the scope and spirit of this invention and it is understood this invention is limited only by the following claims.

What is claimed is:

1. A two-piece armored vehicle cab system, the cab system comprising:
   an upper cab portion;
   a lower cab portion; and
   a vehicle chassis system, wherein the upper cab portion and the lower cab portion are armored to provide protection to occupants of the cab system, the upper cab portion removably mates to the lower cab portion at a mating line comprising a lower edge of the upper cab portion and an upper edge of the lower cab portion, and the lower cab portion is mounted to the vehicle chassis system such that the vehicle chassis system is drivable when the upper cab portion is removed from the lower cab portion as well as when the upper cab portion is mated to the lower cab portion.

2. The cab system of claim 1 further comprising at least one armored cab door, and the cab door comprises an upper door section and a lower door section that are hinged at the mating line such that in one mode of operation the upper door portion folds down, and, alternatively, in another mode of operation, the lower door portion fold ups when the upper and lower cab portions are separated.

3. The cab system of claim 1 further comprising at least one armored cab door, and the cab door comprises an upper door section that remains with the upper cab portion, and a lower door section that remains with the lower cab portion when the upper and lower cab portions are separated.

4. The cab system of claim 1 further comprising at least one armored cab door, and the cab door is implemented within the structure of the upper cab portion such that, when the upper cab portion is separated from the lower cab portion, the entire cab door is contained within the upper cab portion.

5. The cab system of claim 1 wherein the lower edge of the upper cab portion and the upper edge of the lower cab portion are implemented as complementary flanges, and the flanges are mechanically coupled via fasteners.

6. The cab system of claim 1 wherein a vehicle where the cab system is implemented has an overall vertical vehicle clearance when the upper cab portion is removed, CU, and the upper cab portion has a height, HU, that is selected such that the overall vertical vehicle clearance when the upper cab portion is removed, CU, is less than vertical vehicle clearance when is upper cab portion is mated to the lower cab portion, and the overall vertical vehicle clearance when the upper cab portion is removed, CU, is less than the maximum vertical stowage clearance of a C-130 transport aircraft.

7. The cab system of claim 1 wherein the upper cab portion is positioned on a bed of a vehicle where the cab system is implemented to provide weight distribution such that the weight concentration on front and rear axles of the vehicle is less than the maximum weight concentration value of a C-130 transport aircraft.

* * * * *